April 23, 1940.  M. J. GIELEGHEM  2,198,532
SLIDING SEAT LATCH
Filed Sept. 21, 1938
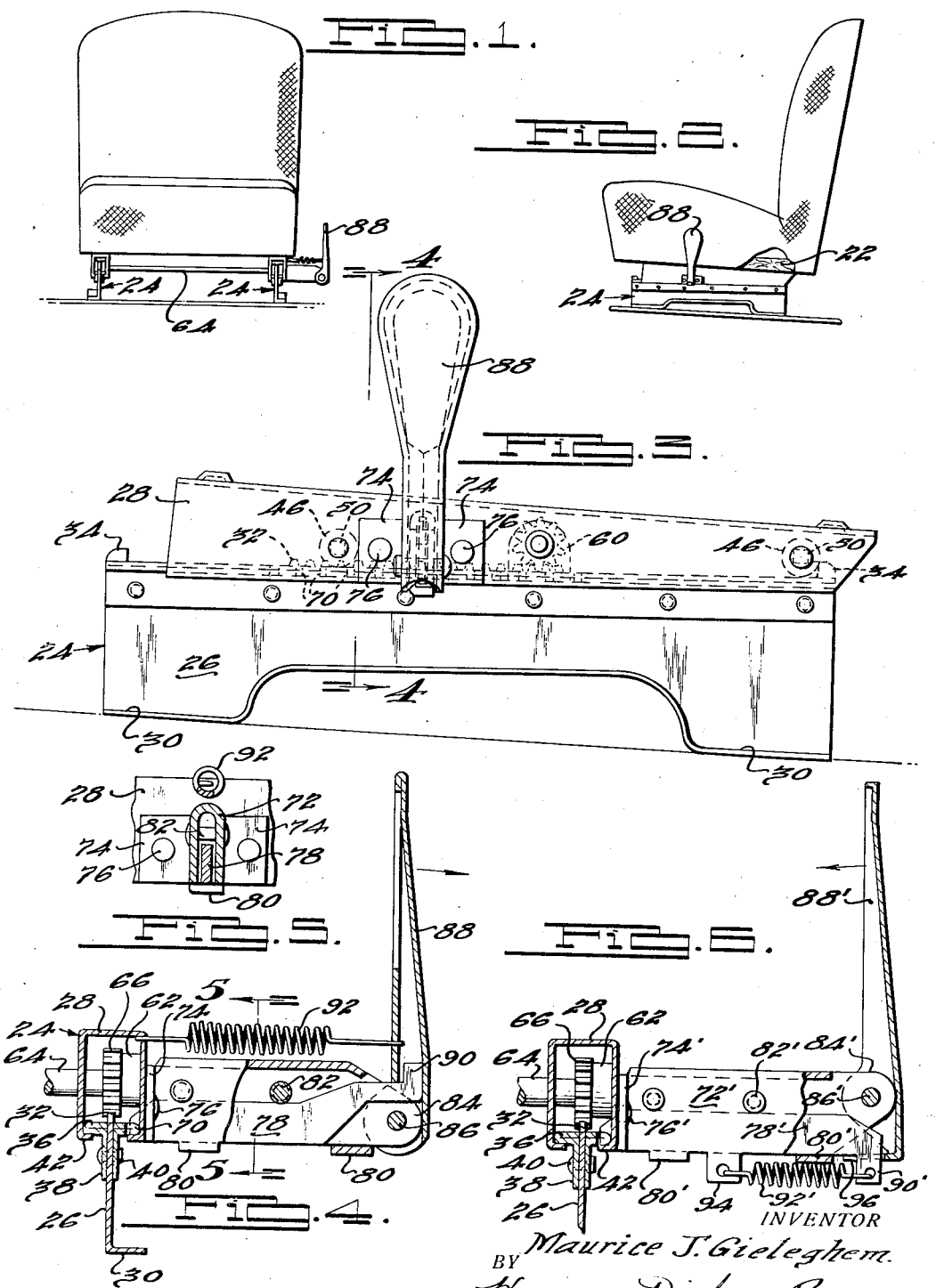

Patented Apr. 23, 1940

2,198,532

UNITED STATES PATENT OFFICE 2,198,532

SLIDING SEAT LATCH

Maurice J. Gieleghem, Detroit, Mich., assignor to National Stamping Company, Detroit, Mich., a corporation of Michigan Application September 21, 1938, Serial No. 230,919

8 Claims. (Cl. 155—14)

This invention relates to latches for retaining sliding seats in slidably adjusted position, the principal object being the provision of a latch of the type described that is simple in construction, economical to manufacture and efficient in operation.

Other objects of the invention include the provision of a sliding seat latch including a supporting bracket formed to provide a housing, a latch bolt reciprocably mounted in housed relation within the bracket, and operating means supported by the bracket cooperating with the latch bolt for controlling the reciprocable position thereof; the provision of a sliding seat latch of the type described in which the operating means comprises a handle pivotally mounted upon the outer end of the brackets; the provision of a construction as above described in which the handle co-acts with the latch bolt in a novel manner; the provision of a construction of the type described in which spring means are employed for constantly urging the latch bolt in one direction of its reciprocable movement and the handle is so associated therewith as to be capable of moving it against the force of the spring; and a latch mechanism as above described in combination with a sliding seat structure.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a front elevational view of a seat of the automobile type provided with a slidably adjustable support and provided with a latching mechanism constructed in accordance with the teachings of the present invention;

Fig. 2 is a partially broken side elevational view of the seat shown in Fig. 1;

Fig. 3 is an enlarged side elevational view of that one of the seat supports shown in Figs. 1 and 2 carrying the latch mechanism;

Fig. 4 is a slightly enlarged, partially broken transverse sectional view taken on the line 4—4 of Fig. 3 and illustrating the construction of the latch mechanism in greater detail;

Fig. 5 is a transverse sectional view taken on the line 5—5 of Fig. 4;

Fig. 6 is a view similar to Fig. 4 but showing a slightly modified form of construction.

Referring to the drawing, in Figs. 1 and 2 a seat 20 of conventional construction is illustrated as including a seat bottom and a seat back portion rigidly connected together. The seat bottom is, of course, provided with the usual base or frame 22 upon which the entire seat structure is built. As illustrated in Figs. 1 and 2 the seat 20 is shown as being slidably adjustably supported upon a pair of supporting units indicated generally at 24, one positioned adjacent each side of the seat in substantial parallelism with each other and with the corresponding sides of the seat. The two units 24 are substantially identical in construction except reversed in position; that is, one is righthanded and the other is lefthanded, and except for the fact that the lefthanded unit, as viewed by a person occupying the seat, is provided with a latch mechanism which, together with the manner in which it cooperates with its corresponding unit, constitutes the principal part of the present invention. Accordingly, a description of the lefthanded unit 24 as viewed by an occupant of the seat will be given as illustrative of the construction of both units and of the present invention.

Each unit 24 comprises generally two main parts, namely a base member 26 and a channel member 28. The base member 26 may be of a conventional two part construction in which means are provided for rigidly securing the two parts together in a variety of positions enabling the height and angle or pitch of the seat and its position longitudinally of the automobile to be varied, but for the purpose of simplicity in the drawing and in the description in the present instance, the base member 26 is shown as including a non-adjustable sheet metal part having the plane of its thickness extending vertically, and as being provided with an out-turned flange 30 along its lower edge for the purpose of providing a means for securing the base member 26 to a floor or other suitable supporting surface. At its upper edge the base member 26 is formed to provide a centrally disposed upwardly projecting gear rack 32 and upwardly projected stops 34 at the opposite ends thereof, its upper edge intermediate each stop 34 and the corresponding end of the gear rack 32 being downwardly relieved or cut away as indicated best in Fig. 3.

The upper edge of the base member 26 carries a rail 36 of equal length which, as best shown in Fig. 4, is provided by means of a T-sectioned member formed from sheet metal to provide a flat topped rail or track and a pair of centrally positioned downwardly projecting leg portions 38 which are spaced from each other by a distance corresponding to the thickness of the member 26 and receive the upper edge of the member 26 between them and are secured thereto by means of rivets 40. The upper horizontal wall of the rail 36 in alignment with the space between the legs 38 is slotted for a distance and at a location corresponding to the gear rack 32 and the stops 34 so that after assembly both the gear rack and the stops project upwardly through these slots in the rail 36 to an operative position above the upper face of the rail as best indicated in Figs. 3 and 4.

The channel member 28 is formed from sheet metal into a channel-like section and as indicated best in Fig. 4 is positioned in inverted relation with the rail 36 relatively closely but readily slidably received between the open marginal edge portions of the channel, and the lower marginal edges of the side walls of the channel are inwardly bent as indicated at 42 so as to lie below the outer side margins of the rail 36 and thereby prevent vertical separation between the base member 26 and channel 28. The channel member 28 is adapted to be rigidly secured to the underside of the seat 20, preferably by means of screws or the like (not shown) extending through apertures in the base of the channel 28 and, for instance, screwed into the base 22 of the seat in a conventional manner. As indicated best in Fig. 3 the channel 28 may vary in depth from end to end so that the seat 20 will be supported thereon at the desired pitch or angle.

Each channel member 28 is supported upon its corresponding rail 36 by means of a pair of rollers 46 rotatably supported within the channel member 28 by means of pins 50 extending between and secured in opposite side walls of the channel member 28. Although not shown it may be mentioned that the rollers 46 are provided with a central groove of a sufficient depth to freely receive the teeth of the rack 32 therein but of insufficient depth to permit the rollers to pass over the stops 34, interengagement with which serves to limit sliding movement of the seat in opposite directions.

As indicated in Fig. 3 the inner wall of each of the channel members 28 at corresponding points in the length of the same is provided with a relatively large inverted U-shaped opening 60 therein cutting through the lower edge of the wall, and the outer wall of each channel member 28 in horizontal alignment with the opening 60 therein is provided with a bearing collar 62 fixed therein as indicated in Fig. 4. Between the bearing collar 62 of each unit 24 a shaft 64 extends and is rotatably received at its ends therein. The shaft 64 adjacent each end thereof is provided with a gear 66 fixed thereto and lying in mesh with the corresponding rack 32. The outer faces of the gear 66 abut against the opposed axial face of the corresponding collars 62 thereby preventing axial movement of the shaft 64 and maintaining the gears 66 axially in mesh with their corresponding gear racks 32. The gears 66 are secured against rotation to the shaft 64 and in this manner equal longitudinal sliding movement of the channel member 28 is assured during slidable adjustment of the seat 20 on the rails 36, as well as holding both channel members in adjusted position by latching only one thereof. The rollers 46 for each channel member 28 are so located in the length of the same that they will contact their corresponding stop members 34 to prevent such movement of the channel members 28 longitudinally of the rails 36 as would permit disengagement of the gears 56 and their racks 32.

With the construction thus far described and which is conventional, it will be apparent that the seat 20 may be readily shifted longitudinally of the rails 36 simply by applying manual pressure thereto and that the weight of the seat and the occupant thereof is transmitted to the rails 36 from the channels 28 through the rollers 46 which thus provide means permitting ready shifting of the seats 20 while supporting the weight of the driver and/or other occupants. Means are provided for releasably latching the seat 20 in any one of a plurality of different positions along the rails 36 and it is in connection with this feature that the present invention deals.

The conventional method of latching the above types of sliding seat mechanisms in longitudinally adjustable position includes the provision of a series of notches such as the notches 70, illustrated in Figs. 3 and 4, in the outer edge of one of the rails 36, and the provision of a pivoted latch arm projecting through a slot in the outer side wall of the channel member 28 and having an inner end releasably engageable with any one of the notches 70 thereby to maintain the channel 28 against movement on the rail 36. These rotatable type of latch arms have not, in the past, proved entirely satisfactory for divers reasons and the present invention has for its object the elimination of the disadvantages of conventional type of latch mechanisms by providing such a latch mechanism with a reciprocable bolt for engagement with the notches 70.

In accordance with the present invention a bracket member 72 is secured to the outer face of the channel 28 engaging the rail 36 having the notches 70 therein. The bracket 72 is formed from sheet metal and as best indicated in Fig. 5 is of inverted U-shaped section. At its inner end the bracket 72 is provided with a pair of oppositely disposed laterally extending flanges 74 which abut against the outer face of the outer side wall of the corresponding channel 28 and are rigidly fixed thereto by means of rivets 76, thus rigidly securing the bracket 72 to the channel 28. Reciprocably received within the channel of the bracket 72 is a latch bolt 78 also preferably formed from a sheet metal but of a relatively heavy gauge. The latch bolt 78 is prevented from dropping out of the bottom of the channel of the bracket 72 by means of a pair of ears 80 formed integrally with one of the side walls of the bracket 72 and bent across the open bottom end of the channel as best indicated in Fig. 5. The latch bolt 78 illustrated is of less depth than the full depth of the channel in the bracket 72 and in order to maintain the latch bolt 78 against upward movement therein, as well as to add rigidity to the bracket, a pair of pins or rivets 82 are projected through opposite walls of the bracket 72 immediately above the upper edge of the latch bolt 78.

The upper inner corner of the latch bolt 78 may be beveled off as indicated in Fig. 4 and the outer wall of the channel 28 in alignment with the latch bolt 78 is provided with an aperture permitting passage of the inner end of the latch bolt 78 therethrough and into engageable relation with respect to the outer edge of the rail 36 in which the notches 70 are formed, it being understood that the inner end of the latch bolt 78 is of such a size as to be receivable in any one of the notches 70. As will be readily appreciated when the inner end of the latch bolt 78 engages in one of the notches 70 in the rail 36, relative sliding movement between the channel 28 and rail 36 is prevented.

The opposite side walls of the bracket 72 are outwardly extended to form a pair of outwardly projecting ears 84 between which is received a pivot pin 86 for the handle 88. The handle 88, as best brought out in Fig. 3, has a channel sectioned lower end in which the ears 84 are received and which lower end is pivotally mounted upon the pin 86. As best illustrated in Fig. 4 the handle 88 is preferably formed from sheet metal to provide a hollow shank portion and the latch bolt 78 is formed to provide an upwardly projecting lug 90 at its outer end which extends up into the hollow interior of such shank. A coiled spring 92 maintained under tension between the channel 28 and the handle 88 constantly urges the handle 88 in a counter-clockwise direction of rotation about the pin 86, as viewed in Fig. 4, and through inter-engagement of the outer wall of the shank of the handle 88 with the lug 90 correspondingly constantly urges the latch bolt 78 inwardly so as to maintain its inner end in engagement with a selected notch 70 in the rail 36. When it is desired to withdraw the latch bolt 78 from engagement with one of the notches 70 so as to permit longitudinal shifting of the channels 28 on the rails 36, the upper end of the handle 88 is moved outwardly, or in a clockwise direction of rotation as viewed in Fig. 4, upon which inter-engagement of the inner wall of the shank of the handle 88 with the lug 90 will pull the latch bolt 78 outwardly against the force of the spring 92 until the inner end of the latch bolt is freed of engagement with the rail 36. Release of the withdrawing pressure on the handle 88 will permit the spring 92 to return both the handle 88 and latch bolt 78 to their normal latching position.

It will be appreciated from the above that the construction provided by the present invention provides a sturdy, economical structure and involves a minimum number of parts and will operate positively and efficiently.

In Fig. 6 a modified form of construction is shown embodying parts substantially equivalent to those illustrated in Fig. 4. Accordingly, the parts identical to those illustrated in Fig. 4 are indicated by the same numerals, and parts which are slightly different but still similar are indicated by the same numerals as indicated in Fig. 4 except that such numerals bear a prime mark. In this case the bracket 72' is substantially similar to the bracket 72 previously described. The latch bolt 78' instead of being offset upwardly at its outer end as in Fig. 4 is provided with a downwardly projecting lug 90' at its outer end which lug projects below the lower face of the bracket 72'. A lug 94 integrally formed with a side wall of the bracket 72' and projecting downwardly therefrom provides an anchor for one end of the spring 92' which is tensioned therebetween and the lug 90' and thus constantly urges the latch bolt 78' towards latching position. The handle 88' in this case is also formed from sheet metal and is pivoted upon the pin 86' carried by the ears 84' of the bracket 72', but its lower end is inturned as at 96 and is apertured for reception of the lug 90' which passes downwardly therethrough. Consequently the tension of the spring 92' also constantly tends to urge the handle 88' to the limit of its movement in a counter-clockwise direction of rotation as viewed in Fig. 6. Inward or counter-clockwise movement of the upper end of the handle 88' causes the end 96 acting through the lug 90 to withdraw the latch bolt 78 from its rail engaging position and thereby release the channel 28 and rail 36 to permit relative longitudinal shifting movement thereof.

Formal changes may be made in the specific embodiments of the invention disclosed without departing from the spirit and substance of the broad invention, the scope of which is commensurate with the appended claims.

What I claim is:

1. Latching means for a sliding seat construction including a pair of relatively slidable members one of which is provided with a plurality of notches or the like therein, comprising, in combination, a generally horizontally extending U-sectioned bracket secured in perpendicularly extending relation with respect to a side face of the unnotched member, a latch bolt reciprocably housed within said bracket for movement longitudinally of the U thereof and being of a thickness to be relatively closely but slidably received between the opposite walls of said U, an end portion on said latch bolt projecting from said bracket and adapted to engage the notches in said one of said members, a handle pivotally mounted upon the outer end of said bracket and cooperatively engaging said latch bolt to effect reciprocation thereof, and means constantly urging said latch bolt in one direction of its reciprocable movement, said bracket, bolt and handle forming a unitary assemblage applicable to said member as such.

2. Latch mechanism for a seat slide construction including a pair of relatively slidable parts one of which is provided with a plurality of notches or the like therein, comprising, in combination, a generally horizontally extending U-sectioned bracket having laterally projecting flanges at one end thereof fixed to the other of said member, a latch bolt reciprocably housed within said bracket for movement longitudinally of the U thereof and provided with an end portion projectable from one end of said bracket into engageable relation with respect to said notches, a handle pivotally mounted upon the other end of said bracket, interengageable means on said handle and said latch bolt for effecting interrelated movement between them, and spring means constantly acting to urge said latch bolt into notch engaging position.

3. A latch mechanism for a sliding seat support including a pair of relatively slidable members one of which is provided with a plurality of notches therein, comprising, in combination, a generally horizontally extending sheet metal bracket having a main body portion of inverted U-shaped section, flanges projecting laterally from one end of said main body portion and fixed with respect to the other of said members, a pair of ears formed integrally with the side walls of said main body portion projecting longitudinally beyond that end thereof opposite said flanges, a handle part pivotally mounted on said ears, a latch bolt part reciprocably housed within said main body portion for movement lengthwise of the channel thereof and having an end engageable with said notched member, means connecting the opposite end of said latch bolt part with said handle part for causing interrelated movement between said parts, and spring means cooperating with one of said parts acting to constantly urge said latch bolt part into notch engaging relation.

4. A latch mechanism for a sliding seat structure including a pair of slidably associated members one of which is provided with a plurality of notches or the like therein, comprising, in combination, a generally horizontally extending sheet metal bracket including an inverted U-sectioned main body portion adapted for securement in perpendicularly extending relation with respect to the other of said members, a latch bolt part reciprocably mounted within said main body portion, ears formed integrally with said main body portion bridging the open edge of said channel whereby to maintain said latch bolt part therein, a handle pivotally mounted upon the outer end of said bracket, means interconnecting said latch bolt part with said handle part constraining said parts to simultaneous movement, and spring means associated with one of said parts constantly urging said latch bolt part towards notch engaging position.

5. A latch mechanism for a sliding seat structure including a pair of slidably associated members one of which is provided with a plurality of notches or the like therein, comprising, in combination, a sheet metal bracket including an inverted U-sectioned main body portion adapted for securement in perpendicularly extending relation with respect to the other of said members, a latch bolt part reciprocably mounted within said main body portion, ears formed integrally with said main body portion bridging the open edge of said channel whereby to maintain said latch bolt part therein, means bridging said channel interiorly of said main body portion above said latch bolt part and cooperating with said latch bolt part to limit movement thereof upwardly of said channel, a handle pivotally mounted upon the outer end of said bracket, means interconnecting said latch bolt part with said handle part constraining said parts to simultaneous movement, and spring means associated with one of said parts constantly urging said latch bolt part towards notch engaging position.

6. A latch mechanism for a sliding seat structure including a pair of relatively slidable members one of which is provided with a series of notches or the like therein, comprising, in combination, a bracket member formed from sheet metal and including a main body portion of U-shaped section, mounting flanges integral with one end of said main body portion and extending in a plane perpendicular to the length of said main body portion, a latch bolt part reciprocably mounted within said main body portion, means formed integrally with said main body portion and extending over the open edge of said channel for maintaining said latch bolt part therein, one end of said latch bolt part adapted for engagement with one of said notches, a laterally projecting lug fixed with respect to the opposite end of said latch bolt part, a handle part pivotally mounted on that end of said main body portion opposite said flanges, said handle part arranged in interengaging relation with respect to said lug whereby to tie said parts together for simultaneous movement, and spring means associated with one of said parts constantly acting to urge said latch bolt part towards notch engaging relation.

7. A latch mechanism for a sliding seat support including a pair of relatively slidable members one of which is provided with a plurality of notches or the like therein, comprising, in combination, a sheet metal housing, laterally projecting flanges at one end of said housing adapted to be fixed to a side face of the other of said members, a latch bolt reciprocably mounted in said housing and provided with an end projectable therefrom for engagement with said notches, a lug formed on the opposite end of said latch bolt, a handle pivotally mounted on that end of said housing opposite said flanges, and a hollow shank on said handle adapted to receive said lug therein for effecting simultaneous movement of said handle and said latch bolt.

8. A latch mechanism for a sliding seat support including a pair of relatively slidable members one of which is provided with a plurality of notches or the like therein, comprising, in combination, a sheet metal housing, laterally projecting flanges at one end of said housing adapted to be fixed to a side face of the other of said members, a latch bolt reciprocably mounted in said housing and provided with an end projectable therefrom for engagement with said notches, a lug formed on the opposite end of said latch bolt, a handle pivotally mounted on that end of said housing opposite said flanges, a lateral projection on said handle having an aperture therein, said lug received in said aperture whereby to associate said latch bolt and handle for simultaneous movement.

MAURICE J. GIELEGHEM.